W. T. MORROW.
Car Brake.
No. 41,042. Patented Dec. 22, 1863.
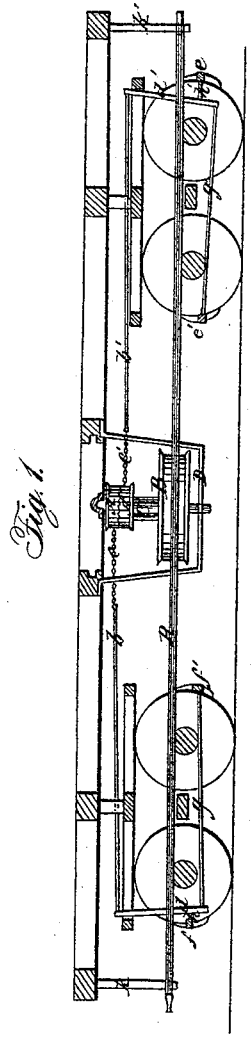
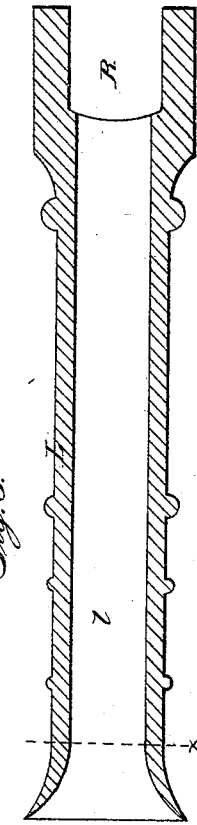
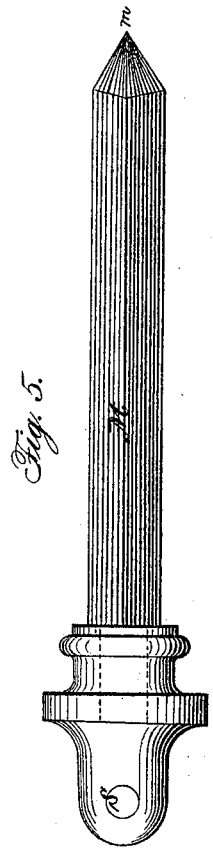
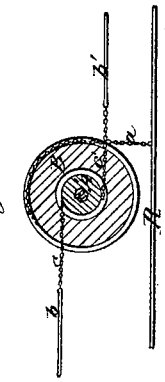
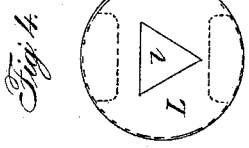
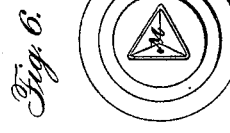
Witnesses:
Inventor:
W. T. Morrow

UNITED STATES PATENT OFFICE.

W. T. MORROW, OF CHICAGO, ILLINOIS, ASSIGNOR TO WARRICK MARTIN, ROSALINE N. AMBLER, AND ELIZABETH JOHNSON.

IMPROVEMENT IN CAR-BRAKES.

Specification forming part of Letters Patent No. 41,042, dated December 22, 1863; antedated June 22, 1863.

*To all whom it may concern:*

Be it known that I, W. T. MORROW, of Chicago, in the county of Cook and State of Illinois, have invented certain new and useful Improvements in the Mode of Applying Brakes to Railroad-Car Wheels; and I do hereby declare that the following is a full, clear, and exact description thereof, reference being had to the accompanying drawings and the letters and figures marked thereon, which form part of this specification.

In the aforesaid drawings, hereto annexed, Figure 1 represents a longitudinal vertical section through the center of an ordinary railroad-car, showing a side view of my invention. Fig. 2 represents a top view of the same, showing sections of the two drums A A' and B. Fig. 3 represents a longitudinal, and Fig. 4 a cross-section, of a triangular bell-mouthed sheath, to be fixed upon one end of the tumbling-rod R; and Figs. 5 and 6 represent a side and end view of a corresponding triangular arm or pin, to be attached to the opposite end of said tumbling-rod R.

My invention consists in a novel device for operating the brakes of a railroad-car by means of the continuous tumbling-rod, known as "Ambler's Patent;" and it further consists in an improved mode of making the connections in said rod, between the cars, whereby the connections are rendered more certain and reliable than heretofore, when the cars are run together to make up the train.

To enable those skilled in the art to understand and use my invention, I will now proceed to describe the same with particularity.

R in the drawings represents the continuous tumbling-rod above referred to, which, by means of suitable connections at the ends of the cars, may extend throughout the entire length of the train, and is revolved by steam or some other suitable means at the engine, so that by having suitable devices for each car attached to the said rod R the brakes on all the cars may be applied to the wheels simultaneously simply by revolving the said continuous rod, as aforesaid.

The device whereby I operate the brakes in connection with the tumbling-rod R is shown in Figs. 1 and 2, Fig. 1 being a side view, and Fig. 2 a top view, thereof, and consists of a vertical shaft (marked C) supported by the frame D, with bearings at the upper and lower ends of the shaft, upon which are fixed immovably the two drums A A' and B. To the lower and larger drum, B, is attached the chain marked *a*, which, passing around said drum or cylinder, is fastened to the tumbling-rod R in any suitable manner, as is clearly shown in Fig. 2. To that portion of the upper drum marked A is attached the chain *c*, which is connected by the rod *b* with the lever *d*, operating the brakes *f f'*; and to the lower part of the upper drum (marked A') is attached the chain *c'*, which, by means of the rod *b'*, is connected with the lever *d'*, operating the brakes *e e'*. By this arrangement, when the tumbling-rod R is revolved, as aforesaid, the chain *a* is wound around it, thereby causing the drum B, the shaft C, and the drum A A' to revolve, winding the chains *c c'* around the upper drum, to which they are attached, as shown in the drawings, and thus by means of the levers *d d'* and the rods *g g'* and *h h'*, the brakes are applied to the wheels as desired.

The drum A A' is constructed in two parts, (marked A and A', respectively,) the lower end of A and the upper end of A' being provided with corresponding ratchet-surfaces, mutually fitting each other, as shown in the drawings, so that when A is kept down firmly upon A' the two parts operate in the same manner as though the upper drum were constructed of a single piece. A is kept in position upon A' by means of a collar upon the shaft C, which is secured by a pin passing through the collar and shaft. The collar and pin whereby the two parts of the upper drum are kept together are not represented in the drawings, not being any part of my invention. That part of the shaft C which lies within A' is of a hexagonal form, as shown in Fig. 2, or may be of any other form that would prevent the said part A' from revolving or rotating upon it; but that part of the shaft C lying within that part of the upper drum marked A is round, so that upon raising A up from A', so as to free it from the ratchet-surfaces, it will readily revolve upon the shaft. By raising A' to a sufficient height it also may be made to turn upon the shaft C in the same manner as A.

The object of the last-described arrangement—namely, the construction of the upper drum—is to obviate any difficulty which may arise from the wearing away of the brakes at one end of the car faster than the brakes at the other end thereof, as the brakes e e' faster than the brakes f f'. In such case, as above supposed, when the brakes are applied, the chain c would be tense, while the chain c' would be slack, and thus it would be impossible to apply the brakes with equal effect. To obviate this, the pin and collar or other device holding and keeping A down upon A' being removed, the part A, to which the chain c is attached, is raised so as to allow it to revolve upon the shaft C, and again adjusted upon A' in such a manner that there shall be the same amount of slack in each chain, or so as to bring the chain c to the same degree of tension as c'.

Figs. 3, 4, 5, and 6 illustrate my improved mode of making the connections in the tumbling-rod R, Fig. 3 being a longitudinal section of a triangular bell-mouthed sheath, which is fixed upon one end of the rod R, at the end of the car, as shown, Fig. 4 being a cross-section of the same at the line x in Fig. 3, L representing the sheath, and l the hollow cavity therein. Figs. 5 and 6 are similar views of a corresponding triangular plunger or arm pointed at end m, which, being attached to the opposite end of the rod R, enters into the aforesaid sheath L, when the cars are run together to make up the train, fitting the socket l, thus forming a continuous rod through the train, the sheath L, from its shape, preventing the turning of the plunger M within it. The method of forming this connection described by Mr. Ambler is by means of a rectangular sheath and pin; but there is much uncertainty about the rods connecting properly, with his arrangement, it being necessary that the lines bounding the face of the pin should lie exactly parallel to the lines bounding the cavity in the sheath, whereas by my triangular arrangement the sheath L and the arm M will in all cases readily and mutually adjust themselves to each other, thus insuring the utmost certainty in forming the connections.

Having thus described my invention, I will now state what I claim as my invention, and desire to secure by Letters Patent:

1. The arrangement of the two drums A A' and B with the chains a, c, and c', in combination with the tumbling-rod R, constructed and operating substantially as and for the purposes herein delineated and set forth.

2. The arrangement of the drum A A', constructed in two parts, with the vertical shaft and the chains c and c', when constructed, arranged, and operating substantially as and for the purposes herein shown and described.

W. T. MORROW.

Witnesses:
SAMUEL S. JOHNSON,
W. E. MARRS.